United States Patent [19]

Kitahara et al.

[11] Patent Number: 4,677,153

[45] Date of Patent: Jun. 30, 1987

[54] METHOD FOR MODIFYING RUBBERS

[75] Inventors: Shizuo Kitahara, Kawaguchi; Yoshitsugu Hirokawa; Toshihiro Fujii, both of Kamakura, all of Japan

[73] Assignee: Nippon Zeon Co., Ltd., Tokyo, Japan

[21] Appl. No.: 843,616

[22] Filed: Mar. 25, 1986

[30] Foreign Application Priority Data

Mar. 29, 1985 [JP] Japan .................................. 60-65985

[51] Int. Cl.$^4$ ............................................... C08F 8/30
[52] U.S. Cl. .................................... 524/552; 524/565; 524/566; 524/572; 525/329.3; 525/331.1; 525/331.2; 525/331.3; 525/332.8; 525/332.9; 525/333.1; 525/333.2; 525/359.3; 525/367; 525/371; 525/374
[58] Field of Search ............ 525/367, 371, 374, 359.3; 524/552, 565, 566, 572

[56] References Cited

U.S. PATENT DOCUMENTS

| | | | |
|---|---|---|---|
| 3,506,638 | 4/1970 | Hsieh | 525/359.3 |
| 3,804,798 | 4/1974 | Cantor | 525/359.3 |
| 3,890,294 | 6/1975 | Sheppard et al. | 525/359.3 |
| 3,928,291 | 12/1975 | Sanda, Jr. | 525/359.3 |
| 4,052,542 | 10/1977 | Wei et al. | 525/359.3 |

*Primary Examiner*—Joseph L. Schofer
*Assistant Examiner*—Bernard Lipman
*Attorney, Agent, or Firm*—Sherman and Shalloway

[57] ABSTRACT

A method for modifying a rubber having unsaturated bonds, characterized by reacting said rubber with (a) an organic compound (I) having a group represented by the formula —CH=N— and (b) an organic acid halide (II) having a group represented by the formula —COX (X is a halogen atom), in the place of a Lewis acid.

12 Claims, No Drawings

METHOD FOR MODIFYING RUBBERS

This invention relates to a method for modifying a rubber having unsaturated carbon-to-carbon bonds.

For the purpose of improving the physical properties (e.g. green strength, adhesion) of unvulcanized or vulcanized rubbers, it has conventionally been known to introduce into rubbers a polar group such as carboxyl group or the like, for example, to allow rubbers to undergo addition of a compound such as maleic anhydride, glyoxal or the like. However, many of these addition reactions are liable to cause side reactions resulting in gelation, molecular weight reduction, etc. of rubbers and, consequently, the rubbers obtained have lower strengths when vulcanized and the efficiencies of the reaction rate, etc. are low.

Therefore, it is the object of the present invention to provide a method for modifying a rubber having unsaturated bonds which can improve the green strength of the rubber as well as the tensile characteristics and rebound resiliency of the rubber when vulcanized, without causing the above mentioned inconveniences.

In order to achieve the above object, the present invention provides a method for modifying a rubber having unsaturated bonds, characterized by reacting the rubber with (a) an organic compound (I) having a group represented by the formula —CH=N— and (b) an organic acid halide (II) having a group represented by —COX (X is a halogen atom), in the presence of a Lewis acid.

As the rubber having unsaturated bonds, used in the present invention (hereinafter this rubber is referred, in some cases, to as the unsaturated rubber or simply as the rubber), there are mentioned rubbers having unsaturated carbon-to-carbon bonds, such as homopolymer rubbers of a conjugated diene (e.g. butadiene, isoprene, piperylene, 2,3-dimethylbutadiene, chloroprene), copolymer rubbers of at least two of the above conjugated dienes, copolymer rubbers of at least one of the above conjugated dienes and at least one other monomer, ring-opening polymer rubbers of a cycloolefin (e.g. cyclopentene, norbornene), polymer rubbers of a cyclic diene (e.g. ethylidenenorbornene, cyclopentadiene) and polyolefin rubbers (e.g. copolymer rubbers of said cyclic diene and an olefin). Typical examples of such rubbers include natural rubber, guayule rubber, a polyisoprene rubber, a polybutadiene rubber, a styrene-butadiene copolymer rubber, a butadiene-isoprene copolymer rubber, an isoprene-styrene copolymer rubber, a butadiene-isoprene-styrene copolymer rubber, a butadiene-piperylene copolymer rubber, a butadiene-propylene alternating copolymer rubber, a polypentenamer, an ethylene-propylenediene copolymer rubber, a butyl rubber, a butadiene-acrylonitrile copolymer rubber, a butadiene-isoprene-acrylonitrile copolymer rubber, a polychloroprene rubber, a styrene-butadiene-styrene block copolymer rubber, a styrene-isoprene-styrene block copolymer rubber, etc.

The organic compound (I) having a group represented by the formula —CH=N—, used in the present invention [hereinafter the organic compound (I) is referred, in some cases, to as the compound (I)] is more particularly a compound which is represented by the general formula R—CH=N—R' wherein R and R' are each an aliphatic, alicyclic or aromatic residue (the residue can appropriately have an atomic group such as an alkoxyl group, a cyano group, a carboalkoxyl group, a carboxyl group, a dialkylamino group or the like). Specific examples of the organic compound (I) include benzylidenemethylamine, benzylidenebutylamine, benzilideneaniline, benzylidenecyclohexylamine, propylidenebutylamine, propylideneaniline, cyclohexylidenebutylamine, cyclohexylideneaniline, ethoxybenzylidenebutylaniline, 4-carboxylbenzylidenebutylaniline, 4-carbomethoxybenzylidenebutylamine, 4-carbomethoxybenzylidenebutylamine, benzylidene-4-cyanoaniline, benzylidene-4-carboxylaniline, dimethylaminobenzylidenebutylaniline, etc.

The organic acid halide (II) having a group represented by the formula —COX (X is a halogen atom), used in the present invention [hereinafter, the organic acid halide (II) is referred, in some cases, to as the compound (II)] is more particularly a compound which is represented by the general formula R"—COX wherein X is a halogen atom and R" is and aliphatic, alicyclic or aromatic residue (the residue can appropriately have an atomic group such as an alkoxyl group, a halocarbonyl group or the like). Specific examples of the organic acid halide (II) include acetyl chloride, acetyl bromide, benzoyl chloride, benzoyl bromide, carbomethoxybenzoyl chloride, oxalyl chloride, terephthalic chloride, etc.

The amounts of the compounds (I) and (II) used are not particularly restricted. However, they are ordinarily each 0.001 to 30 parts by weight, preferably 0.1 to 10 parts by weight per 100 parts by weight of the unsaturated rubber.

The Lewis acid used in the present invention can be those ordinarily known. Typical examples include metal halides and semimetal halides (e.g. halides of such elements as Be, B, Al, Si, P, S, Ti, V, Fe, Zn, Ga, Ge, As, Se, Zr, Nb, Mo, Cd, Sn, Sb, Te, Ta, W, Hg, Bi and U as well as halides of such oxides as PO, SeO, SO, $SO_2$ and VO), organic halides and complexes thereof. Specifically there are mentioned $BF_3$, $BF_3O(C_2H_5)_2$, $(CH_3)_2BF$, $BCl_3$, $AlBr_3$, $(C_2H_5)AlCl_2$, $POCl_3$, $TiCl_4$, $VCl_4$, $MoCl_6$, $SnCl_4$, $(CH_3)SnCl_3$, $SbCl_5$, $TeCl_4$, $TeBr_4$, $FeCl_3$, $WCl_6$, etc. Particularly preferable are $SnCl_4$, $SbCl_5$, $AlCl_3$, etc., because they give a high reaction rate and a low degree of side reactions. The amount of the Lewis acid used is not particularly restricted but ordinarily is 0.01 to 5 moles, preferably 0.05 to 2 moles per 1 mole of the compound (II).

The modification reaction of the present invention is ordinarily conducted in a solvent. The solvent can freely be selected from aromatic hydrocarbon solvents (e.g. benzene, toluene), paraffinic hydrocarbon solvents (e.g. butane, hexane), halogenated hydrocarbon solvents (e.g. chloroform, ethane dichloride), etc. However, it suitably is a solvent which is inactive in the reaction but does dissolve a rubber to be modified.

The compound (I), the compound (II) and the Lewis acid can be added to the reaction system in one portion at the start of the reaction, or, in portions or continuously in the course of the reaction. They can be added to the reaction system separately, or, two or all of them can be mixed beforehand and the mixture can be added to the reaction system.

In conducting the reaction, it is necessary to keep the reaction system in a water-free state or in a state wherein the water content is below a specified level. The reaction temperature is not particularly restricted but ordinarily is −20° to 100° C., preferably −10° to 60° C. The reaction time is not particularly restricted, either, and can freely be set between 10 sec and 10 hours.

When the reaction is conducted in a solvent, addition of, for example, a large amount of an alcohol or an aqueous alkali solution to the reaction system can substantially stop the reaction and further can coagulate the modified rubber. The rubber coagulated is, as necessary, washed to remove various residues from the rubber and then dried, whereby a modified rubber product can be obtained.

With the modified rubber product is mixed with ordinary compounding agents for rubbers (e.g. a vulcanizing agent, a vulcanizing accelerator, a vulcanizing aid, a reinforcing agent and a softener) and, if necessary, also with ordinary rubbers, the resulting unvulcanized blend has an excellent green strength and consequently very good moldability. The blend, particularly, the blend containing carbon black, when vulcanized, is excellent in characteristics such as tensile stress and the like and accordingly is used not only in general applications but also particularly preferably in those applications requiring said characteristics, such as tire carcass and tread, rubber vibration insulators, hoses, belts for industrial use and the like. The modified rubber obtained from the present invention method can also be used in ordinary latex applications, in the form of a latex.

It was confirmed that in the present invention method the compounds (I) and (II) cause addition to the unsaturated portions of rubber chain. This addition of the compounds (I) and (II) is considered to contribute to the improvement in green strength of unvulcanized rubber blend and in tensile stress, etc. of vulcanized rubber blend.

When it is tried to react a rubber having unsaturated bonds with only the compound (I) or (II) in the presence of a Lewis acid, no addition of the compound (I) or (II) to the unsaturated chain portions of the rubber takes place. In this case, therefore, the improvement of the rubber in physical properties is impossible.

Next, the present invention will be explained specifically by way of Examples. In each Example, the preparation of unvulcanized and vulcanized rubber blends of modified rubber and the testing of physical properties of these blends were conducted as follows.

[Wallace plasticity of rubber]

It was measured at 100° C. using a Wallace's rapid plastometer.

[Preparation of unvulcanized rubber blend]

The materials shown in the following compounding formulation, other than sulfur and the vulcanization accelerator, were kneaded in a small Banbury mixer. To the resulting mixture were added sulfur and the vulcanization accelerator on a small roll, and they were kneaded to obtain an unvulcanized rubber blend.

| Compounding formulation (parts by weight) | | | |
|---|---|---|---|
| Cis polyisoprene rubber* | 100 | — | — |
| Cis polybutadiene rubber* | — | 100 | — |
| Vinyl polybutadiene rubber* | — | — | 100 |
| HAF carbon | 50 | 50 | 50 |
| Aromatic oil | 5 | 5 | 5 |
| Zinc oxide | 5 | 3 | 3 |
| Stearic acid | 2 | 2 | 2 |
| Sulfur | 2.5 | 1.5 | 1.0 |
| N—oxydiethylene-2-benzo-thiazylsulfeneamide (vulcanization accelerator) | 0.8 | 1.1 | 2.0 |
| N—isopropyl-N'—phenyl-p-phenylenediamine | | | |

*Modified according to the present invention method.

[Green strength]

An unvulcanized rubber blend was press-molded at 100° C. for 5 minutes to prepare an unvulcanized rubber sheet of 2 mm in thickness. Dumbbell-shaped specimens meeting JIS K 6301 No. 3 were punched from the rubber sheet and subjected to a tensile test at 25° C. at a pulling rate of 500 mm/min to measure a tensile stress at 500% elongation.

[Tensile test]

An unvulcanized rubber blend was subjected to press vulcanization at 145° C. (160° C. for an unvulcanized polybutadiene blend) for a predetermined time to obtain a 2 mm thick sheet. Dumbbell-shaped specimens meeting JIS K 6301 No. 3 were punched from the sheet and subjected to a tensile test at 25° C. at a pulling rate of 500 mm/min.

[Rebound resiliency]

It was measured at 25° C. using a Dunlop tripsometer on a vulcanized rubber blend obtained by heating an unvulcanized rubber blend at 145° C. (160° C. for an unvulcanized polybutadiene rubber) for a predetermined time.

EXAMPLE 1

160 g of a polyisoprene rubber (cis-1,4 bond=98%) was dissolved in 3 liters of dehydrated toluene. The resulting solution was placed in a sealed glass vessel (a separable flask). Thereto were added the compound (I), the compound (II) and the Lewis acid all specified in Table 1, each as a benzene solution, and the whole mixture was subjected to a reaction at 25° C. for 1 hour in a nitrogen atmosphere with stirring. The reaction mixture was poured into 3 liters of methyl alcohol to completely coagulate the modified rubber. The rubber was made into fine pieces and washed. Then, the rubber in fine pieces was immersed in 3 liters of methyl alcohol containing about 2 g of an oxidation inhibitor (2,6-ditertiarybutyl-4-methylphenol) for washing and dried for 24 hours in a vacuum drier. Thus, modified polyisoprene rubber samples A, B, C and D were obtained.

Next, these samples were subjected to measurements of physical properties. The results are shown in Table 2.

As is appreciated from Table 2, the samples A, B, C and D, as compared with the unmodified polyisoprene rubber, are significantly improved in green strength, 300% stress and rebound resiliency.

TABLE 1

| | Compound (I) | Amount of compound (I) (mM) | Compound (II) | Amount of compound (II) (mM) | Lewis acid | Amount of Lewis acid (mM) |
|---|---|---|---|---|---|---|
| A | Benzylidenebutylamine | 20 | Acetyl chloride | 20 | SnCl₄ | 20 |
| B | Benzylidenebutylamine | 25 | Benzoyl chloride | 25 | SnCl₄ | 25 |
| C | Benzylideneaniline | 20 | Acetyl chloride | 20 | SbCl₅ | 20 |
| D | Benzylideneaniline | 30 | Benzoyl chloride | 30 | SnCl₄ | 30 |

TABLE 2

| | Sample | Physical properties of unvulcanized blend | | Vulcanization time (min) | Physical properties of vulcanized blend | | | |
|---|---|---|---|---|---|---|---|---|
| | | Wallace plasticity | Green strength (kg/cm²) | | 300% stress (kg/cm²) | Tensile strength (kg/cm²) | Elongation (%) | Rebound resiliency (%) |
| This invention | A | 46 | 5.9 | 22 | 156 | 280 | 490 | 67 |
| | B | 40 | 28.9 | 21 | 159 | 280 | 490 | 68 |
| | C | 41 | 15.7 | 21 | 163 | 280 | 460 | 67 |
| | D | 38 | 41.3 | 20 | 185 | 280 | 460 | 72 |
| Comparison | Unmodified polyisoprene rubber | 46 | 2.1 | 22 | 130 | 280 | 570 | 63 |

EXAMPLE 2

150 g of a polybutadiene rubber was dissolved in 3 liters of dehydrated benzene. The solution was placed in a sealed glass vessel (a separable flask) and subjected to a reaction at 25° C. for 1 hour in a nitrogen atmosphere under the reaction conditions specified in Table 3. 100 ml of methanol was added thereto to stop the reaction. Then, the reaction mixture was poured into 3 liters of methanol containing 1% of 2,6-ditertiarybutyl-4-methylphenol to completely coagulate the modified rubber. The rubber was made into fine pieces, washed and dried for 24 hours in a vacuum drier to obtain samples E, F and G.

Next, these samples were subjected to measurements of (a) green strength of unvulcanized blend and (b) physical properties of vulcanized blend. The results are shown in Table 4.

As is appreciated from Table 4, the samples E, F and G, as compared with the comparative sample, are excellent in green strength, strength characteristics and rebound resiliency.

separable flask). Thereto was added a benzene solution containing a mixture of the compound (I), the compound (II) and the Lewis acid all specified in Table 5. The whole mixture was subjected to a reaction at 25° C. for 60 minutes in a nitrogen atmosphere with stirring. Thereto was added 100 ml of methanol (which presumably stopped the addition reaction). Then, the reaction mixture was poured into 4 liters of methyl alcohol to completely coagulate the modified rubber. The rubber was made into fine pieces and washed. The rubber in fine pieces was immersed in 3 liters of methyl alcohol containing about 2 g of an oxidation inhibitor (2,6-ditertiarybutyl-4-methylphenol) for washing and dried for 24 hours in a vacuum drier. Thus, samples H and I were obtained.

Next, the physical properties of the samples H and I and of the unmodified polyisoprene rubber were measured in the same manner as in Example 1. The results are shown in Table 6.

As is appreciated from Table 6, the green strength, 300% stress and rebound resiliency of the samples H and I according to the present invention method are significantly improved over those of the unmodified polyisoprene rubber.

TABLE 3

| | Polybutadiene | Molar ratio of compound (I) and compound (II) in their mixture | Amount of a mixture of compound (I) and compound (II) (mM) | Lewis acid | |
|---|---|---|---|---|---|
| | | | | Kind | Amount (mM) |
| E | cis-1,4 bond 98% | Benzylidenebutylamine/acetyl chloride = 1/1 | 25 | SnCl₄ | 25 |
| F | cis-1,4 bond 98% | Benzylideneaniline/benzoyl chloride = 1/1 | 30 | SnCl₄ | 30 |
| G | Vinyl bond 70% | Benzylidenebutylamine/acetyl chloride = 1/1 | 25 | SnCl₄ | 25 |

TABLE 4

| | Sample | Physical properties of unvulcanized blend | Vulcanization time (min) | Physical properties of vulcanized blend | | | |
|---|---|---|---|---|---|---|---|
| | | Green strength (kg/cm²) | | 300% stress (kg/cm²) | Tensile strength (kg/cm²) | Elongation (%) | Rebound resiliency (%) |
| This invention | E | 3.2 | 15 | 135 | 190 | 390 | 58 |
| | F | 5.8 | 15 | 159 | 189 | 330 | 63 |
| | G | 6.0 | 25 | 158 | 214 | 390 | 53 |
| Comparison | Unmodified cis-1,4-butadiene rubber | 0.8 | 15 | 103 | 193 | 450 | 52 |
| | Unmodified vinyl-butadiene rubber | 1.2 | 25 | 124 | 168 | 370 | 42 |

EXAMPLE 3

160 g of a polyisoprene rubber (cis-1,4 bond = 98%) was dissolved in 4 liters of dehydrated benzene. The resulting solution was placed in a sealed glass vessel (a

TABLE 5

| Sample | Mixture of compound (I)/compound (II)/Lewis acid | Proportion (molar ratio) | Addition amount (mM) |
|---|---|---|---|
| H | Benzylidenebutylamine/acetyl chloride/SnCl$_4$ | 1/1/1 | 10 |
| I | Benzylidenebutylamine/acetyl chloride/SbCl$_5$ | 1/1/0.9 | 15 |

TABLE 6

| | Sample | Physical properties of unvulcanized blend | | Vulcanization time (min) | Physical properties of vulcanized blend | | | |
|---|---|---|---|---|---|---|---|---|
| | | Wallace plasticity | Green strength (kg/cm$^2$) | | 300% stress (kg/cm$^2$) | Tensile strength (kg/cm$^2$) | Elongation (%) | Rebound resiliency (%) |
| This invention | H | 36 | 80.2 | 21 | 200 | 260 | 410 | 69 |
| | I | 37 | 59.0 | 21 | 203 | 260 | 410 | 70 |
| Comparison | Unmodified polyisoprene rubber | 46 | 2.1 | 22 | 130 | 280 | 570 | 63 |

We claim:

1. A method for modifying a rubber having unsaturated bonds, characterized by reacting said rubber at −20° C. to 100° C. with (a) 0.001 to 30 parts by weight, per 100 parts by weight of the rubber, of an organic compound (I) represented by the formula R—CH=N—R' and (b) 0.01 to 30 parts by weight, per 100 parts by weight of the rubber, of an organic acid halide (II) represented by the formula R"—COX (wherein R, R' and R" are each, independently, aliphatic, alicyclic or aromatic residues and X is a halogen atom), in the presence of 0.01 to 5 moles, per mole of organic acid halide (II), of a Lewis acid.

2. A method according to claim 1 wherein the rubber having unsaturated bonds is selected from homopolymer rubbers of a conjugated diene, copolymer rubbers of at least two conjugated dienes, copolymer rubbers of at least one conjugated diene and at least one other monomer, ring-opening polymer rubbers of a cycloolefin, polymer rubbers of a cyclic diene and polyolefin rubbers.

3. A method according to claim 1 wherein the Lewis acid is a metal halide or a semimetal halide.

4. A method according to claim 1 wherein the reaction is conducted in the presence of a solvent.

5. A rubber composition comprising a rubber obtained from claim 1 and carbon black.

6. A method according to claim 1 wherein the organic compound (I) is selected from the group consisting of benzylidenemethylamine, benzylidenebutylamine, benzylideneaniline, benzylidenecyclohexylamine, propylidenebutylamine, propylideneaniline, cyclohexylidenebutylamine, cyclohexylideneaniline, ethoxylbenzylidenebutylaniline, 4-carboxylbenzylidenebutylaniline, 4-carbomethoxybenzylidenebutylamine, 4-carbomethoxybenzylidenebutylamine, benzylidene-4-cyanoaniline, benzylidene-4-carboxylaniline and dimethylaminobenzylidenebutylaniline.

7. A method according to claim 1 wherein the organic acid halide (II) is selected from the group consisting of acetyl chloride, acetyl bromide, benzoyl chloride, benzoyl bromide, carbomethoxybenzoyl chloride, oxalyl chloride and terephthalic chloride.

8. A method according to claim 1 wherein the organic compound (I) and the organic acid halide (II) are reacted with the rubber in amounts of from 0.1 to 10 parts by weight, per 100 parts by weight of the rubber.

9. A method according to claim 1 wherein the Lewis acid is present in an amount of from 0.05 to 2 moles per mole of the organic acid halide (II).

10. A method according to claim 4 wherein the solvent is an aromatic hydrocarbon solvent, a paraffinic hydrocarbon solvent, or a halogenated hydrocarbon solvent.

11. A rubber composition according to claim 5 in the unvulcanized state.

12. A rubber composition according to claim 5 in the vulcanized state.

* * * * *